Patented July 21, 1953

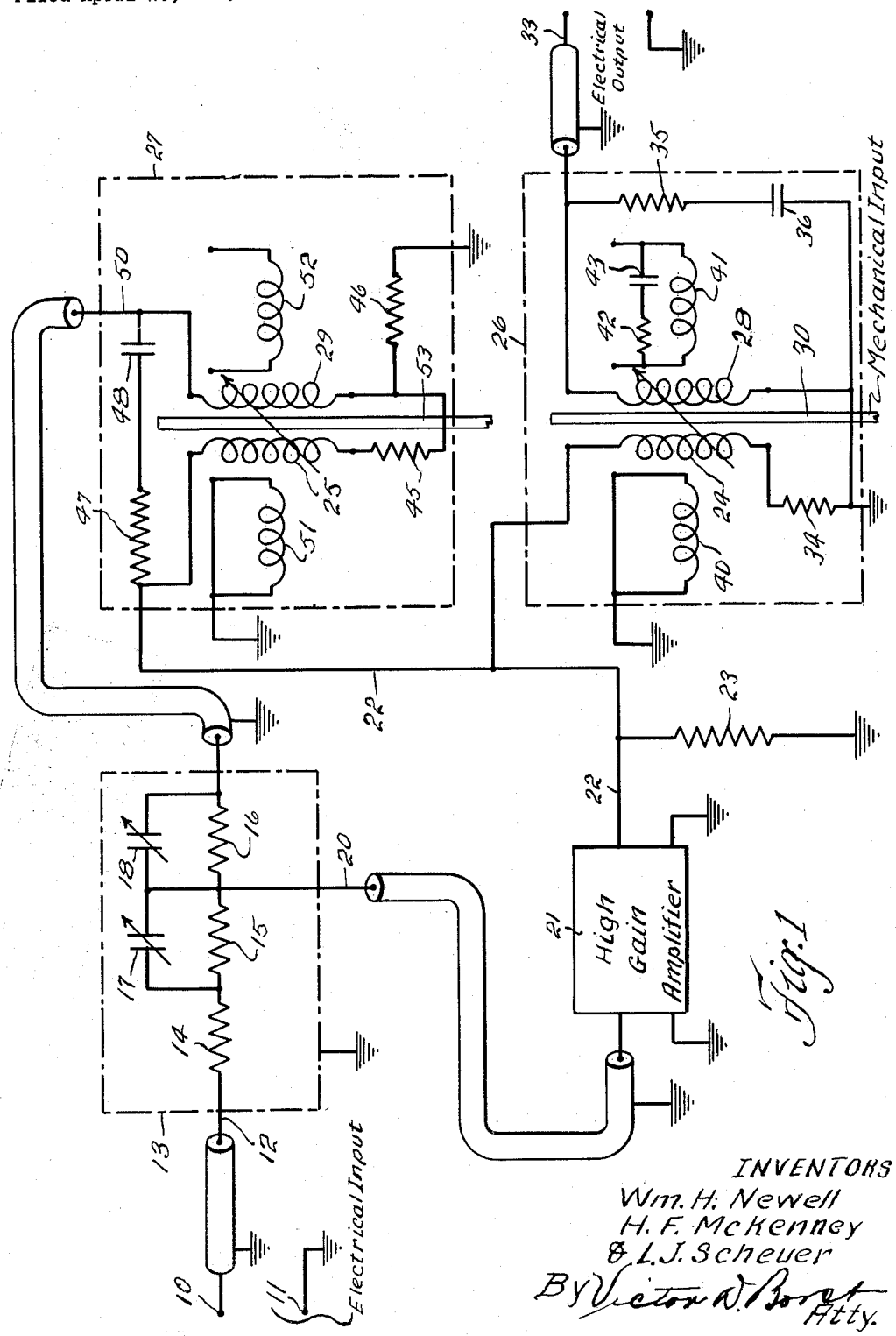

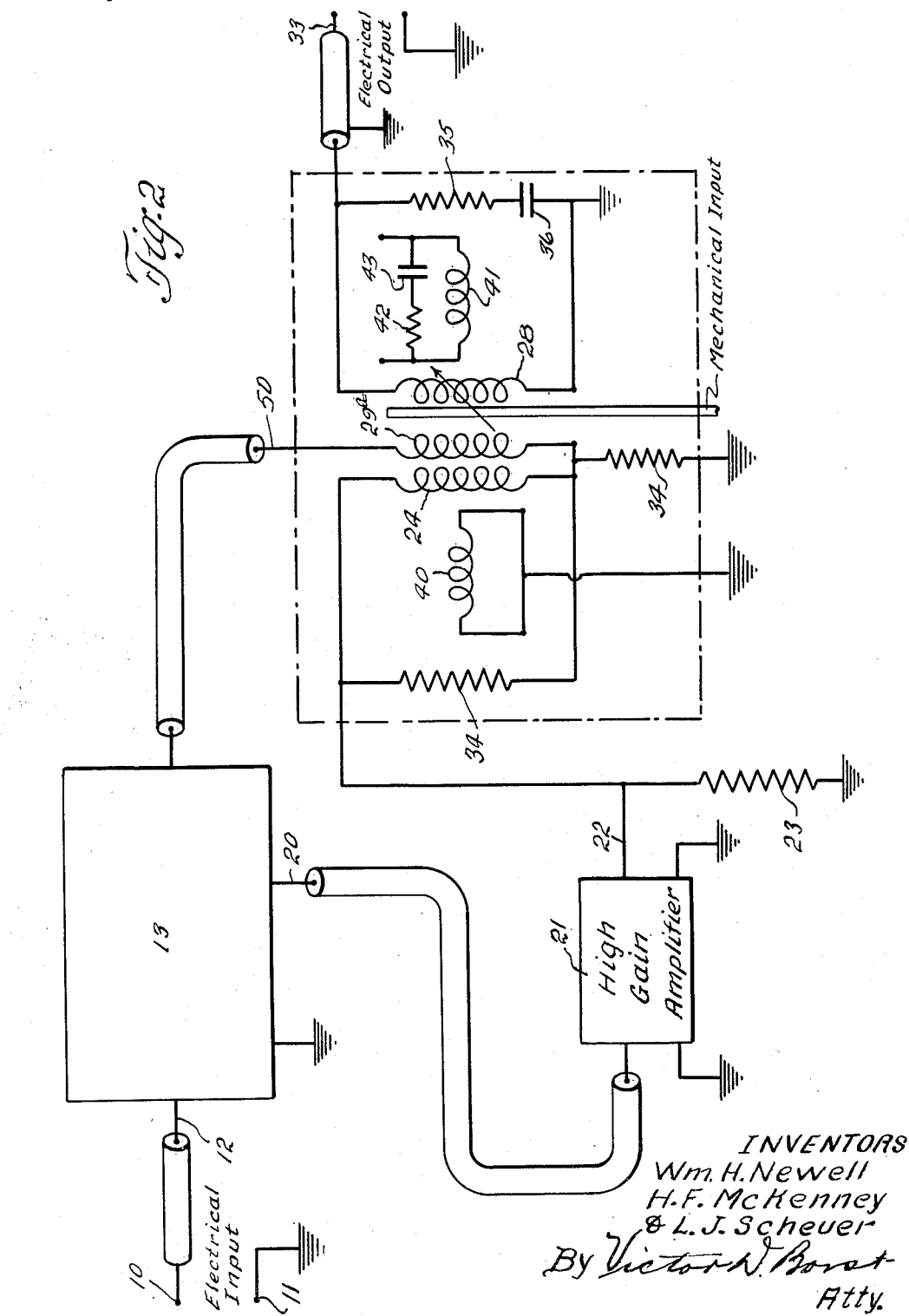

2,646,218

UNITED STATES PATENT OFFICE 2,646,218

DISTORTIONLESS ELECTRICAL RESOLVER

William H. Newell, New York, Henry F. McKenney, Flushing, and Lewis J. Scheuer, Farmingdale, N. Y., assignors to The Sperry Corporation, a corporation of Delaware Application April 25, 1950, Serial No. 157,892

5 Claims. (Cl. 235—61)

This invention relates to an electrical resolver system having an output voltage proportional to a sine or cosine function of an angle which is introduced mechanically and has for an object to provide a resolver of the above type having a high degree of accuracy for use in making mathematical computations.

Other objects and advantages will be apparent as the nature of the invention is more fully described.

In one embodiment of the invention a rotary transformer having distributed stator and rotor windings is used to derive the angle function voltage. The stator and rotor are so wound that the output voltage derived from the rotor represents accurately the sine or cosine function of the angular position of the rotor when the stator is supplied with a constant voltage. Some output voltage waveshape distortion is inherent in such a unit, however, and it is a further object of the invention to attenuate this distortion and also to provide a system having a high input impedance, a low output impedance, a high order of linearity (input to output) and a high accuracy of computation.

These results are obtained in the present system by introducing a high gain amplifier ahead of the computing resolver and connecting an identical resolver in parallel with the computing resolver to the output of the amplifier. The output of the second resolver is fed back as a negative feed-back to the input of the amplifier. Since the feed-back resolver is identical electrically and magnetically with the computing resolver the same distortion products are present in its output. The two resolvers may have a common primary.

The nature of the invention will be better understood from the following description and the accompanying drawing in which a specific embodiment has been set forth for purposes of illustration.

In the drawing:

Fig. 1 is a schematic diagram of a system embodying the invention, and

Fig. 2 is a similar schematic diagram illustrating a further embodiment of the invention.

Referring to Fig. 1, a constant input voltage $E_{in}$, for example, a sinusoidal 400 cycle voltage, is applied at input terminals 10 and 11. The terminal 11 is shown as grounded and the terminal 10 is connected by a shielded lead 12 to an input network 13 comprising resistors 14, 15 and 16 connected in series and variable condensers 17 and 18 shunting resistors 15 and 16, respectively. The junction of resistors 15 and 16 is connected by a shielded lead 20 to the input of a high gain amplifier 21 having an output lead 22 connected across a load resistor 23 and to the stator windings 24 and 25 of resolvers 26 and 27 having rotor windings 28 and 29, respectively. The rotor of the resolver 26 is mounted on a shaft 30 by which the angular position of the rotor is varied in accordance with the mechanical input. The rotor winding 28 is connected to a shielded output lead 33. The stator winding 24 is connected to ground through a resistor 34 and the rotor winding 28 is grounded through a resistor 35 and condenser 36.

The resolver 26 is of the synchro type having distributed windings connected to provide four poles and disposed to provide an output voltage in the rotor winding which is accurately proportional to the sine or cosine of the angular position of the rotor. A sinusoidal flux distribution over the pole faces has been found necessary for this purpose.

A quadrature stator winding 40 is shorted to ground. A resistor 42 and capacitor 43 are connected in series across a quadrature rotor winding 41. One of the rotor windings produces a sine function voltage and the other winding produces a cosine function voltage. Hence the winding selected for use depends upon the function desired.

The feed-back resolver windings are connected together through a resistor 45 and the winding 29 is grounded through a resistor 46. The windings are also connected together through a resistor 47 and condenser 48 and the winding 29 is connected by a shielded lead 50 to the resistor 16 of the input network 13. The feed-back resolver is identical with the computing resolver and includes a quadrature stator winding 51 which is shorted to ground and a quadrature rotor winding 52 which is open. The rotor of the feed-back resolver is mounted on a shaft 53 and is adjustable but normally fixed.

The input network 13 is a 1-to-1 network with 1 megohm in each leg. This 1-to-1 relationship is precisely adjusted for both amplitude and phase. The output of this network, or summation voltage, which is the sum of the input and negative feed-back voltages, is fed to the first stage of the high-gain amplifier 21. The feed-back voltage is almost equal in magnitude to the input voltage, but is opposite in phase. This feed-back voltage also contains inherent magnetic distortion due to the feed-back resolver. Hence, the voltage applied to the computing resolver will contain resolver distortion, but of opposite sense from that which would be produced in the computing resolver itself if operated from a purely sinusoidal input. This produces the compensating distortion qualities desired for the overall system.

On the input leg of the input network the resistor 14 is added in order to provide that any feed-back resolver installed in the system will have sufficient gain to produce a 1-to-1 voltage relationship for the overall resolver system.

The high-gain amplifier 21 may have a gain of approximately 20,000. The amplifier works into the lead resistor 23 in parallel with the primaries 24 and 25 of the computing and feed-back resolvers.

The rotor 29 of the feed-back resolver is locked in a position such as to produce a transformation ratio between stator and rotor which is essentially unity, minus the small amount necessary to correct the overall gain of the resolver system. Since the negative feed-back voltage of this resolver is very large, the high-gain amplifier stability is exceptionally great.

It should be noted that in this resolver 27, only one stator winding and one rotor winding are used; the rotor winding is so connected that a voltage of negative polarity with respect to the input voltage will be fed back to the input network 13.

Resistor 47 and condenser 48 act as a frequency response network. The purpose of the network is to equalize the frequency response of the system in order to prevent parasitic oscillation of cascaded resolver systems due to cross-coupling. Resistor 46 is designed to prevent low-frequency oscillation within the resolver system.

Resistor 45 is a phase-compensating element. The value of this resistor will vary from unit to unit, its purpose being to make the phase shift properties of all feed-back resolver units identical, thus rendering any feed-back resolver interchangeable with any other.

Normally only one stator winding of the computing resolver 26 is used, the other being short-circuited. Either rotor winding, or both rotor windings, may be used in particular embodiment, depending on the desired output from the resolver system.

The value of resistor 34 will vary slightly from unit to unit; its purpose being to render identical the phase shifts of all computing resolver units, and to compensate the resolver system for temperature changes. The temperature coefficient of resistance of the wire used is such that the resolver system is electrically compensated over the temperature range −60° F. to +160° F.

Resistor 35 and condenser 36 form a frequency response network serving the same purpose as resistor 47 and condenser 48 in the feed-back resolver circuit. If both rotor windings of the computing resolver are used, identical networks are bridged across each rotor winding.

Shielded cable is employed where shown to minimize cross-coupling between resolver systems. Also in order to keep resolver systems identical, a certain level of capacitance to ground is employed both in the line from the feed-back resolver to the network box, and in the line from the computing resolver output. To establish this level, mica trimmer capacitors of value sufficient to bring each line capacity to ground up to the desired level are placed across the lines at the input ends. The values of the capacitors will, of course, vary with the physical length of line in an individual resolver system application.

Since the cable from the network 13 to the high-gain amplifier will be short in physical length, it will require no capacitance compensation.

The operation of the feed-back amplifier circuit can be described mathematically in the following manner: As in any single-loop negative feed-back system, the feed-back gain may be written as $$\left(\frac{u}{1+Bu}\right)$$

where $(u)$ is the gain of the high-gain amplifier, and $(B)$ is the proportion of output feed-back to the input. In this case, $(u)$ is sufficiently large that the gain is very closely approximated simply by $$\left(\frac{1}{B}\right)$$

Thus the feed-back amplifier circuit itself is extremely linear and stable with respect to temperature and power-supply changes, etc. Moreover, $(B)$ can be considered to be the resultant of two contributing factors; the position of the feed-back resolver rotor, which determines the stator-to-rotor voltage transformation ratio, and a second-order factor consisting of all the distortion elements in the feed-back loop only. In practice, the feed-back resolver rotor is set so as to make $(B)$ very nearly unity, the only difference from unity being that necessary to make the overall gain of the resolver system (at maximum output) exactly unity. Moreover, the second-order distortion factor in the feed-back loop which contributes to $(B)$ is found to consist solely of distortion in the feed-back resolver itself; specifically, distortion due to magnetic saturation. But, since the feed-back resolver and the computing resolver are identical electrically and magnetically, this distortion, which by affecting $(B)$ appears in the feed-back amplifier output, is just sufficient to compensate for the same type and degree of distortion which is inherent in the computing resolver. Assuming a sinusoidal input to the feed-back amplifier circuit, a wave containing certain components of distortion will appear at the input to the computing resolver, due to magnetic saturation of the feed-back resolver. However, when this input to the computing resolver is distorted in like manner and degree but in the opposite sense by the feed-back resolver, the output of the overall system will once again be more nearly sinusoidal. Moreover, the presence of a very high feed-back factor contributes to produce a very high input impedance and a very low output impedance.

The resolver system described above is a device for producing two output voltages which are equal to its electrical input signal multiplied by plus or minus the sine and/or plus or minus the cosine, respectively, of its mechanical input angle. If a bearing-mounted computing resolver is employed in the system, this angle may actually consist of two separate input angles, the sine and cosine of the sum or difference of which are used as the multipliers of the electrical input. The output voltages are in time phase with the electrical input signal.

Linear and non-linear distortions which arise in an amplifier system may be corrected by causing the output potential to produce a degenerative or negative feed-back regeneration upon the input of the amplifier. In this case the feed-back resolver output is essentially the same as the amplifier system output and is therefore producing the proper type of negative feed-back regeneration. In the case of amplifier systems, amplitude distortion may be reduced by feeding back from the amplifier output to its input a voltage opposite in phase to that of the impressed signal.

In this particular case the distortion is greatly reduced because the feed-back voltage closely approximates the true output voltage and is therefore fulfilling the requirements for distortion reduction due to negative feed-back. The shorted stator windings perform an important function. It would be very desirable if the stator windings 25 and 29 would produce magnetic fields exactly perpendicular to their physical location. Due to combined electrical and mechanical problems this is practically impossible. The purpose of the stator windings 24 and 25 is to overcome this flux misalignment. For example, suppose the flux produced by winding 24 is misaligned, a vector representing this quantity can be broken up into two components, one being exactly perpendicular to the winding 24 itself, and a much smaller one being perpendicular to winding 40. This smaller flux quantity induces a voltage in winding 40 and by Lenz's law winding 40 will produce a flux in the opposite direction to the original one. This will cause a cancelling of the quadrature flux components and tend to leave the resolver functioning more nearly with a flux vector perpendicular to winding 24.

Winding 41 is the cosine winding output.

Elements 42 and 43, along with elements 35, 36, 47, and 48 tend to produce an overall flat frequency response for the resolver system. This tends to minimize oscillation possibilities when several of these resolver systems are cascaded.

Fig. 2 is the same as Fig. 1 except that the feed-back voltage is obtained from a winding that is an integral part of the computing resolver.

The system shown in Fig. 2 is generally similar to that of Fig. 1 and the corresponding parts have been given the same reference characters. In this form the feed-back resolver includes a secondary 29a which is wound with the primary 24 of the computing resolver and forms a part of the same unit. This has the advantage of avoiding difference in characteristics due to differences in construction of two separate units. The primary 24 thus forms a part of both the computing resolver and the feed-back resolver.

Although a specific embodiment has been set forth for purposes of illustration, the invention may be applied to various uses and changes and adaptations may be made therein as will be apparent to a person skilled in the art.

What is claimed is:

1. An electrical computing system comprising a computing resolver and a feed-back resolver, said resolvers being identical electrically and each having a stator and a rotor with windings thereon, means positioning the rotor of the computing resolver in accordance with a mechanical input, a high gain amplifier, means supplying an electrical input signal to said amplifier, means connecting said amplifier to feed the stator windings of both of said resolvers in parallel, means feeding back the signal derived from the rotor winding of the feed-back resolver in a negative sense to the input of said high gain amplifier, and means deriving an output signal from the rotor winding of said computing resolver, said negative feed-back being adjusted to introduce into said amplifier distortion signals which substantially compensate for the distortion produced by the computing resolver and thereby produce substantially a distortionless output signal which represents the value of the electrical input signal multiplied by an angle function of the said mechanical input.

2. A computing system as set forth in claim 1 in which said stators are provided with additional quadrature windings which are shorted to ground.

3. A distortionless electrical system comprising a pair of identical magnetic transformers comprising synchro units having stator and rotor windings, an amplifier, means supplying an electrical input signal to said amplifier, means connecting said amplifier to feed said stator windings in parallel, means connecting one of said rotor windings to supply a feed-back signal to the input of said amplifier in a negative sense and of a value to compensate for the distortion products introduced by said transformers, and means deriving an output signal from the other rotor winding, said output signal being free of said distortion products.

4. A computing system as set forth in claim 3 in which said output winding is connected to represent a sine function of the angular position of the rotor of the computing resolver.

5. A computing system as set forth in claim 3 in which said output winding is connected to represent a cosine function of the angular position of the rotor of the computing resolver.

WILLIAM H. NEWELL.
HENRY F. McKENNEY.
LEWIS J. SCHEUER.

References Cited in the file of this patent
UNITED STATES PATENTS

| Number | Name | Date |
| --- | --- | --- |
| 2,209,955 | Block | Aug. 6, 1940 |
| 2,406,836 | Holden | Sept. 3, 1946 |
| 2,417,229 | Alexanderson | Mar. 11, 1947 |
| 2,434,270 | Holden | Jan. 13, 1948 |
| 2,467,646 | Agins | Apr. 19, 1949 |